United States Patent
Gopalakrishnan et al.

(10) Patent No.: US 11,836,036 B2
(45) Date of Patent: Dec. 5, 2023

(54) METHOD OF DETECTING FAULTS IN INTELLIGENT ELECTRONIC DEVICES

(71) Applicant: ABB Schweiz AG, Baden (CH)

(72) Inventors: Abhilash Gopalakrishnan, Bengaluru (IN); Jithin Kizhakey Putanvetil, Kerala (IN); Manigandan P, Gudiyattam (IN); Arinjai Gupta, Bengaluru (IN); Martin Nykvist, Singsby (FI)

(73) Assignee: ABB Schweiz AG, Baden (CH)

( * ) Notice: Subject to any disclaimer, the term of this patent is extended or adjusted under 35 U.S.C. 154(b) by 45 days.

(21) Appl. No.: 17/439,020

(22) PCT Filed: Mar. 9, 2020

(86) PCT No.: PCT/IB2020/052016
§ 371 (c)(1),
(2) Date: Sep. 14, 2021

(87) PCT Pub. No.: WO2020/183340
PCT Pub. Date: Sep. 17, 2020

(65) Prior Publication Data
US 2022/0147410 A1 May 12, 2022

(30) Foreign Application Priority Data
Mar. 14, 2019 (IN) .............................. 201941009958

(51) Int. Cl.
*G06F 11/00* (2006.01)
*G06F 11/07* (2006.01)
(Continued)

(52) U.S. Cl.
CPC ........ *G06F 11/079* (2013.01); *G06F 11/0772* (2013.01); *G06F 11/3006* (2013.01); *G06F 18/24155* (2023.01)

(58) Field of Classification Search
None
See application file for complete search history.

(56) References Cited

U.S. PATENT DOCUMENTS

| 8,140,898 B2 * | 3/2012 | Beg ..................... G06F 11/2257 714/25 |
| 10,613,962 B1 * | 4/2020 | Delange ................. G06N 7/005 |

(Continued)

OTHER PUBLICATIONS

Google Scholar/Patents search—text refined (Year: 2020).*
(Continued)

*Primary Examiner* — Christopher S McCarthy
(74) *Attorney, Agent, or Firm* — Leydig, Voit & Mayer, Ltd.

(57) ABSTRACT

A method for detecting a fault in an intelligent electronic device that includes components uses a Bayesian network. The method includes detecting a failure event in the components, obtaining a first list of cause of failures in the component using a fault tree model, computing probability of the cause of failures to obtain a second list of probable causes of failure by monitoring of information about the elements identified in the first list, identifying a root cause of failure associated with the element comprised in the component using the Bayesian network based on the second list, and initiating a function. The function may be one of restarting the element having the root cause of failure, a filtering operation for input data provided to that element; and providing an alert in the human machine interface associated with the intelligent electronic device.

11 Claims, 3 Drawing Sheets

(51) Int. Cl.
*G06F 11/30* (2006.01)
*G06F 18/2415* (2023.01)

(56) References Cited

U.S. PATENT DOCUMENTS

| | | | |
|---|---|---|---|
| 11,416,326 B2* | 8/2022 | He | G06F 11/0709 |
| 11,561,850 B1* | 1/2023 | Banerjee | G06F 11/079 |
| 2005/0160324 A1 | 7/2005 | Przytula et al. | |
| 2010/0083056 A1 | 4/2010 | Spier et al. | |
| 2010/0199132 A1 | 8/2010 | Compton et al. | |
| 2012/0166869 A1* | 6/2012 | Young | G06F 11/0754 |
| | | | 714/15 |
| 2012/0173933 A1 | 7/2012 | Greb et al. | |
| 2013/0024417 A1 | 1/2013 | Joanni et al. | |
| 2014/0032172 A1* | 1/2014 | McCarthy | G05B 23/0227 |
| | | | 702/183 |
| 2017/0123809 A1 | 5/2017 | Chisholm | |

OTHER PUBLICATIONS

"Fault Diagnosis of Train Network Control Management System Based on Dynamic Fault Tree and Bayesian Network", Wang et al. IEEE Access, Nov. 22, 2020 (Year: 2020).*
Google Scholar/Patents search—text refined (Year: 2023).*
European Patent Office, International Search Report in International Patent Application No. PCT/IB2020/052016, 4 pp. (dated Jul. 8, 2020).
European Patent Office, Written Opinion in International Patent Application No. PCT/IB2020/052016, 10 pp. (dated Jul. 8, 2020).

* cited by examiner

| Attribute | Probability |
|---|---|
| P(RelayFail | FRWKFail, COMFail) | 0.99 |
| P(RelayFail | FRWKFail, ~COMFail) | 0.9 |
| P(RelayFail | ~FRWKFail, COMFail) | 0.9 |
| P(RelayFail |~ FRWKFail, ~COMFail) | 0.0 |
| P(FRWKFail | PeriphFail) | 0.5 |
| P(FRWKFail | ~PeriphFail) | 0.1 |
| P(COMFail | PeriphFail) | 0.8 |
| P(COMFail |~ PeriphFail) | 0.2 |
| | |

METHOD OF DETECTING FAULTS IN INTELLIGENT ELECTRONIC DEVICES

BACKGROUND

One or more embodiments of the present invention may relate generally to the field of intelligent electronic devices used for protection and control in power systems and more particularly to a method of detecting faults in intelligent electronic devices.

Intelligent Electronic Devices (IED) are used for protection and control of electrical equipment in an electrical network connecting the electrical equipment especially for protection during an undesirable fault condition. The protection is carried out by having the IED operate a circuit breaker by providing a trip signal and electrically isolate the electrical equipment. The IED is communicatively connected over a communication network used in an industrial automation system (substation automation system, distribution automation system, process plant control system). In a substation automation system or/and a distribution automation system, protection relays are important components lying at the bottom of a hierarchical communication network having first hand access to electrical parameters associated with the power systems. IEDs in addition to playing the role of protection which isolates the faulty section of electrical subsystems from the rest of the electrical grid, also play an active role in post-fault power restoration and self-healing networks with the help of supported communication network.

IEDs also are provided with user interfaces like Local Human Machine Interface (LHMI) to interact and operate (configure, view device/power system related parameters). A modern protection relay can also support HMI through a web browser, from a remote client station which acts as a remote HMI, connectivity to a computer system or a mobile handset for relay configuration and monitoring.

Maloperation of IEDs are caused majorly due to incorrect settings of the IED, erroneous logic designs, inherent failures of the IED, and communication failures. Failures are also contributed due a failure in hardware like loose terminations, failed processor, failed I/O board, failed power supply etc. Some of these failures are rectified by replacing the components for which there is a need for detection of the failed components. In some other cases the components would require calibrations or restart of the processing elements.

Currently, when failure occurs in an IED, before going to an unstable state the IED reports an error code with a basic description displayed in the Human Machine Interface (HMI). Usually, support is provided manually to analyze the error code by comparing with available technical manuals to find methods for rectifying the faults. Technical support intervention is required in most cases to find a solution to the identified fault. This is a cumbersome process with high Mean Time to Repair (MTTR) due to low speed in terms of detection of the problem since the indication of fault is in the form of codes to be decoded manually by technicians. As the time for detecting and rectifying the problem is quite high there is a need for a method that provides efficient and quick detection of the cause of failure while providing an actionable diagnosis.

SUMMARY

One or more embodiments of the present invention may provide a method for detecting and rectifying a fault in an intelligent electronic device. The IED comprising a plurality of components, each component from the plurality of components comprise an interface wherein the interface provides information associated with working of at least one element of the component and enables and disables operation of the at least one element of the component, and a supervision and diagnostic module comprising a fault tree model and a Bayesian network, the method comprising: detecting a failure event in the plurality of components of the IED; obtaining a first list of cause of failures in at least one component from the plurality of components of the IED using the fault tree model; computing probability of the cause of failures to obtain a second list of probable causes of failure by monitoring of information associated with working of elements comprised in the at least one component identified in the first list; identifying at least one root cause of failure associated with the at least one element comprised in the at least one component using the Bayesian network based on the second list; initiating at least one of the functions of:

a) restarting at least one element comprised in the at least one component associated with the root cause of failure based on enabling and disabling operation through the interface of the at least one component;

b) enabling a filtering operation for input data provided to the at least one element comprised in the at least one component associated with the root cause of failure; and c) providing an alert in the HMI associated with the IED.

In an embodiment the method mentioned herein above comprises, detecting a failure event in the plurality of components comprises comparing an output from at least one element of the plurality of components to a pre-defined value of output.

In another embodiment, the at least one element is a flash driver, analog to digital converters, universal serial bus driver, disturbance recorder, communication, and application function engine running a plurality of application functions comprising protection function, overcurrent, pre-processing.

In yet another embodiment, the fault tree model is based on common causes failures analysis further refined by event logs and audit trails.

In yet another embodiment, the method comprises restarting of the at least one element associated with the root cause of failure results in persistence of failure event, an alert with a recommendation for replacement of the element associated with root cause of failure is provided to the HMI.

In another aspect, one or more embodiments of the present invention may provide an intelligent electronic device (IED) with a supervision and diagnostic module for detecting and rectifying faults in a plurality of components comprised in the IED, the supervision and diagnostic module comprising a fault tree model and a Bayesian network, each component from the plurality of components comprise an interface wherein the interface provides information associated with working of at least one element of the component and enables and disables operation of the at least one element of the component; the IED is configured to: detect a failure event in the plurality of components of the IED; obtain a first list of cause of failures in at least one component from the plurality of components of the IED using the fault tree model; compute probability of the cause of failures to obtain a second list of probable causes of failure by monitoring of information associated with working of elements comprised in the at least one component identified in the first list; identify at least one root cause of failure associated with the at least one element comprised in the at least one component using the Bayesian network based on the second list; initiate at least one of the functions of:

a) restarting at least one element comprised in the at least one component associated with the root cause of failure based on enabling and disabling operation through the interface of the at least one component;

b) enabling a filtering operation for input data provided to the at least one element comprised in the at least one component associated with the root cause of failure; and c) providing an alert in the HMI associated with the IED.

In an embodiment the IED further comprising a hardware, an operating system and a framework.

In another embodiment, the framework comprises a configuration manager that comprises: configuration information for the elements of the plurality of components; information in relation to connections of the various elements of the components; and contextual information of the configurations and connections of the components.

In another embodiment, the IED is enabled with Internet of Things connectivity.

In yet another embodiment, the HMI can be a remote HMI connected through a cloud-based system.

BRIEF DESCRIPTION OF DRAWINGS

The appended drawings illustrate exemplary embodiments as disclosed herein and are not to be considered limiting in scope. In the drawings:

FIG. 3a shows an exemplary Bayesian network with components; and

FIG. 3b is a table showing value of conditional probability associated with the components considered in the Bayesian network of FIG. 3a.

DETAILED DESCRIPTION

One or more embodiments of present invention may be related to a method for detecting and rectifying a fault in an intelligent electronic device (IED). The method provides for detecting a failure event in the components of the IED, implements Bayesian network to identify the root cause of failure and initiates functions as per the detected fault. For example, on detection of the root cause of failure the method enables the operation of initiating the function of restarting of an element, enabling a filtering operation for input data provided to the element or providing an alert as an actionable diagnosis in the HMI associated with the IED.

In the following detailed description, reference is made to the accompanying drawings that form a part hereof, and which is shown by way of illustration specific embodiments, which may be practiced. These embodiments are described in sufficient detail to enable those skilled in the art to practice the embodiments, and it is to be understood that other embodiments may be utilized. The following detailed description is, therefore, not to be taken in a limiting sense.

Figure 1:
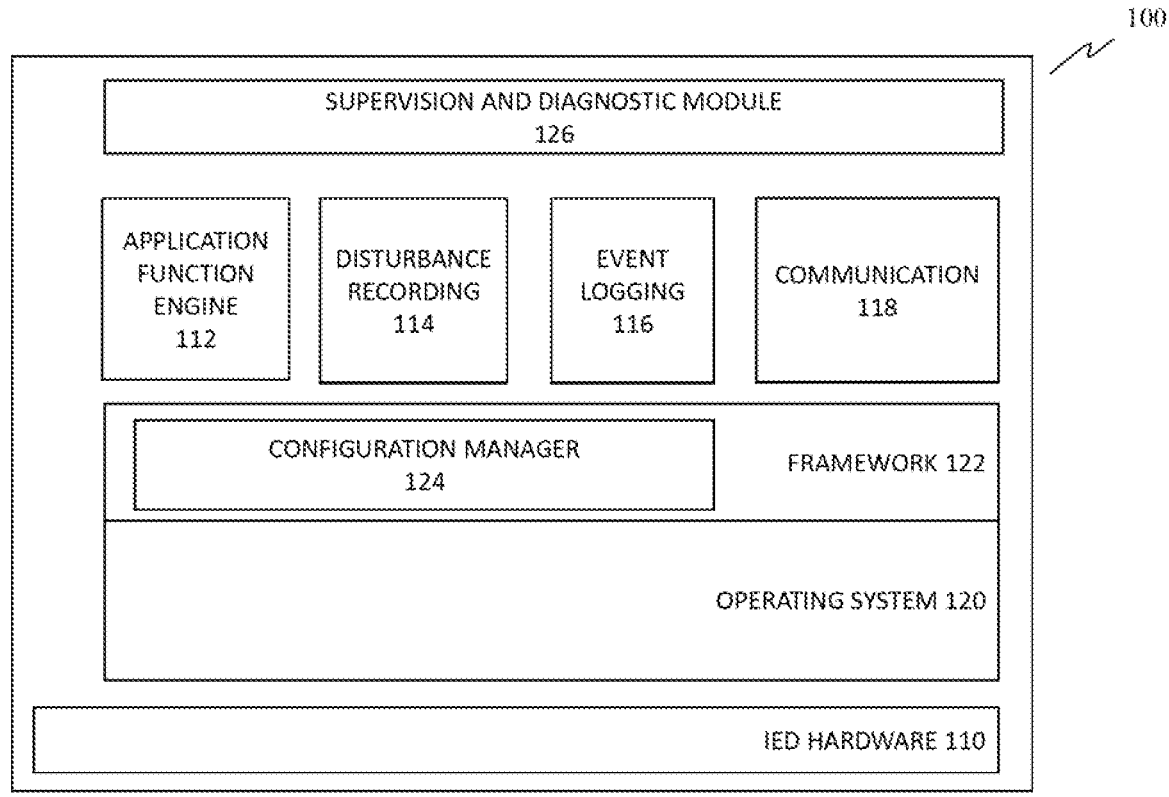
FIG. 1 is a block diagram showing the functional elements in the IED.

FIG. 1 is a simplified block diagram of the IED 100 showing the plurality components in accordance with one or more embodiments. The IED 100 comprises a plurality of components, the plurality of components can include driver level elements (not shown) like flash driver, Analog to Digital Converter (ADC) driver, Universal Serial Bus (USB) driver which are part of the hardware abstraction or board support package layer. The components also comprise application layer elements like Application Function Engine 112, Disturbance Recorder 114, Event Logging 116, Communication 118, HMI control etc. FIG. 1 also depicts the hardware of the IED 110, operating system 120, a framework 122 comprising a configuration manager 124, and a supervision and diagnostic module 126. As would be known to a person skilled in the art, there are other elements present in the IED software which are required for working of the IED but are not shown in FIG. 1 for simplifying the diagrammatic representation, for example modules for cyber security, operating system abstraction layer and other software components are not shown.

Each component from the plurality of components comprise an interface that comply with load, start and stop operations. The interface provides information associated with working of elements of the component. The interface also provides for enabling and disabling the element of the component. The supervision and diagnostic module 126 comprise a fault tree model and a Bayesian network. The fault tree model is based on reliability analysis and is used for detecting a first level of cause failures. Monitoring of the outputs of the components are performed and a comparison with a pre-defined reference is performed to detect a failure event. After a failure event is detected, the fault tree model is implemented to identify the first list of cause of failures or determine the components which have probably caused the failure. Further, the first list of cause of failures is refined using the Bayesian network to identify the root cause of failure. On identification of root cause of failure appropriate actions are taken to rectify the cause of fault or provide recommendation for rectifying the fault. The configuration manager 124 comprises the configuration information for the elements of the plurality of components, the information in relation to connections of the various elements of the components and other contextual information of the configurations and connections of the components.

Figure 2:
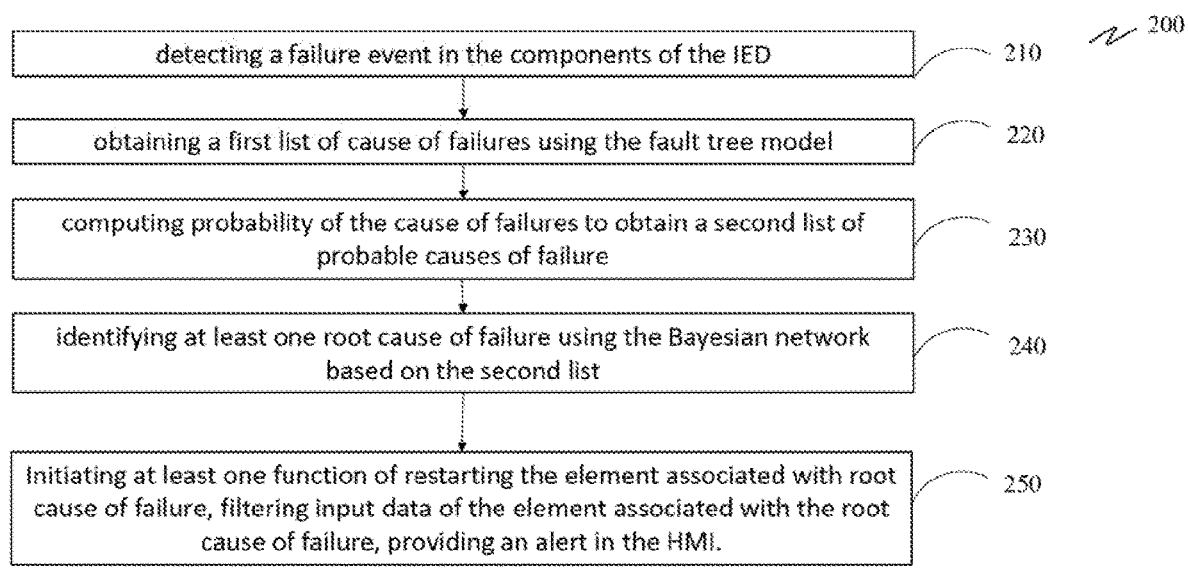
FIG. 2 shows the method for detecting fault in an IED.

FIG. 2 depicts the method 200 for detecting and rectifying the fault in the IED The method may be illustrated with an example of fault detection wherein a fault tree model for detecting failure of IED based on reliability analysis is pre-loaded in the supervision and diagnostic module of the IED The first step of the method 200 comprises the step of detecting a failure event in the components of the IED. The outputs from each of the elements are compared with a pre-defined output to ascertain if a failure exists. If the output from the element under monitoring does not equate to the pre-defined output, a failure event is reported. For example, a failure of Analog to Digital converter (ADC) will report an incorrect value as input to Application Function Engine (AFE). Alternately this could also be a failure caused by a failure of application functions like overcurrent detection function executing in the AFE.

The second step 220 of the method comprises obtaining a first list of cause of failures in at least one component from the plurality of components of the IED using the fault tree model. For example, when a failure is observed by monitoring the results produced by the components like ADC and the Application Function Engine a protection function failure is reported. In this first list of cause of failures the failure can be caused due to ADC failure or Application Function Engine failure.

Step 230 depicts computing the probability of the cause of failures to obtain a second list of probable causes of failure by monitoring working of elements comprised in the first list. At step 230, the supervision and diagnostic module 126 comprising the fault tree model analyses the components identified as cause of failures in the first list and prepares a second list of possible elements which are the key reason for the failure thus reducing the list to the highest probable cause of failure as per the fault tree. If failure is caused due to ADC then the probability is reported as higher than zero and for Application function engine the probability is reported as zero.

Step 240 depicts the step of identifying the root cause of failure associated with the element comprised in the component using the Bayesian network. The root cause of failure element is identified by applying a Bayesian network or Bayesian Belief network based on the second list. The Bayesian Belief network is applied using the priori information or the already reduced second list. The test result values are included as parameters to the network which in turn results in running and listing a set of probability values for the possible root case. For example, the probability values for cause of failure with respect to Application Function Engine is calculated as 0.35 and for ADC failure is 0.77. The one that is reported with highest probability value is identified as the root cause of failure.

At step 250, the framework 122 now initiates three actions on detection of the fault and the root cause of failure. At step 250, the restarting of the element is performed to test if the element, in this case the ADC can recover from the failure. If the element associated with root cause of failure can recover on restarting, then the Supervision and Diagnostic module 126 performs a supervision of all the components in the same manner as described in the method 200. Thus, health of all the components of the IED is checked repeatedly. When the component is successfully restarted and working such a case is reported for display on the HMI. The notification is displayed on the HMI to inform that an error case was encountered, and the IED is currently in working condition. The components are enabled or disabled through their interfaces. In a scenario, where the restart of the components does not lead to successful recovery of the element comprised in the component associated with root cause of failure then an alternate action of filtration of the input data provided to the element associated with root cause of failure is performed by the IED. In some cases, failure could be due to noise or disturbance where in enabling a filter would overcome or enable component to recover. In another alternate action on identifying the root cause of failure an alert is provided in the HMI associated with the IED wherein a recommendation can be provided as to which component is to be replaced.

The Bayesian network is used for identifying the root cause of failure associated with the element comprised in the component identified from the list with highest probability of being cause of failure.

Figures 3A, 3B:
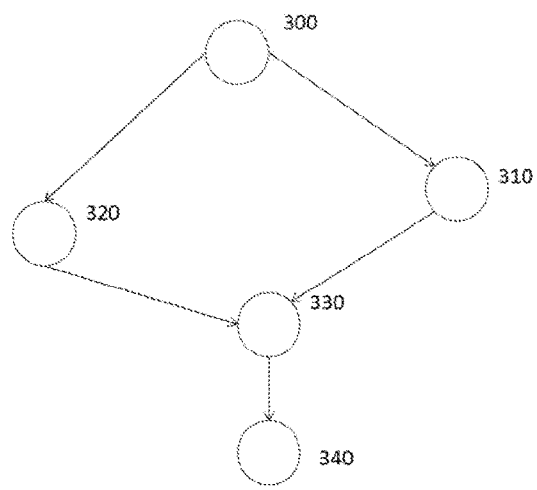

FIG. 3*a* shows an exemplary Bayesian belief network Framework component, Communication Component and Application Service Component as Components. The Bayesian belief network model based on the common cause failures, event logs, audit trails. The Fault tree and probabilistic model are combined in the Bayesian Network. FIG. 3*a* shows the Bayesian network having the nodes indicated by 300 as the condition like movement or a natural calamity, the components communication failure 310, framework failure 320, application function engine 330 and finally IED failure as 340. Framework failure 320 comprises elements in relation to software framework like virtual binary in, binary out, analog inputs, current transformer virtual inputs etc. Communication failure 310 comprises hardware like NIC cards, RS485 interfaces, communication stacks like TCP/IP or IEC 61850. The node 300 that signifies the disturbance that leads to the failures in the various components and movement can be due to natural calamities or anything that involves moving the device/some shaking of the device.

FIG. 3*b* is showing the conditional probability table for the exemplary components. FIG. 3*b* shows the values of conditional probability associated with the components considered in the Bayesian network of FIG. 3*a*. The observations in the table of FIG. 3*b* are made based on how connections exist in configuration of application functions, communication functions and signals of control systems. The output values from these are observed and based on the observed output values the comparison is made to pre-defined values of output values to determine the fault in the components. These could include signals from binary inputs of the IED, analog inputs, pre-processing or sampling, inputs coming from other IED in terms of communication inputs like GOOSE datasets.

Based on the Bayesian Network Model and the observations from the components of the IED, the highest probability component which failed in the event of a new condition is identified and reported as Root Cause of Failure. FIG. 3*b* shows the table wherein the root cause is identified as Communication Failure (COMFail). In some cases, this might mean more than one component.

When the root cause of failure associated with the element comprised in the component is identified the IED launches one of the following three actions:
a) restarting the element associated with the root cause of failure.
b) For elements affected by noise of interference, enabling a filtering operation for input data provided to the element associated with the root cause of failure; and finally
c) providing an alert in the HMI associated with the IED, wherein a basic description provided regarding the action required to be taken to correct the fault condition or that a corrective action has already been undertaken by the IED and a recovery has been made from a faulty condition.

In an embodiment, the IED is also enabled with Internet of Things connectivity. The HMI can be a remote HMI connected through a cloud-based system.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

We claim:

1. A method for detecting and rectifying a fault in an intelligent electronic device, the intelligent electronic device comprising a plurality of components, each component from the plurality of components comprises an interface wherein the interface provides information associated with working of at least one element of the component and enables and disables operation of the at least one element of the component, and a supervision and diagnostic module comprising a fault tree model and a Bayesian network, the method comprising:

detecting a failure event in the plurality of components of the intelligent electronic device;

obtaining a first list of cause of failures in at least one component from the plurality of components of the intelligent electronic device using the fault tree model;

computing probabilities of the causes of failures to obtain a second list of probable causes of failure by monitoring of information associated with working of elements comprised in the at least one component identified in the first list;

identifying a root cause of failure associated with the at least one element comprised in the at least one component using the Bayesian network based on the second list, wherein the second list is obtained before identifying the root cause of failure using the Bayesian network; and initiating at least one of the functions of:

restarting at least one element comprised in the at least one component associated with the root cause of failure based on enabling and disabling operation through the interface of the at least one component;

enabling altering operation for input data provided to the at least one element comprised in the at least one component associated with the root cause of failure; and providing an alert in a human machine interface associated with the intelligent electronic device.

2. The method as claimed in claim 1, wherein detecting a failure event in the plurality of components comprises comparing an output from at least one element of the plurality of components to a pre-defined value of output.

3. The method as claimed in claim 1, wherein the at least one element is a flash driver, analog to digital converter, universal serial bus driver, disturbance recorder, communication, or an application function engine running a plurality of application functions comprising protection function, overcurrent, and pre-processing.

4. The method as claimed in claim 1, wherein the fault tree model is based on common causes failures analysis further refined by event logs and audit trails.

5. The method as claimed in claim 1, wherein restarting of the at least one element associated with the root cause of failure results in persistence of failure event, an alert with a recommendation for replacement of the element associated with root cause of failure is provided to the human machine interface.

6. The method as claimed in claim 1, wherein identifying the root cause of failure associated with the at least one element using the Bayesian network based on the second list further comprises:

using, as a parameter of the Bayesian network, the monitored information associated with the working of elements comprised in the at least one component identified in the first list, wherein the information is monitored after obtaining the first list and before obtaining the second list.

7. An intelligent electronic device comprising a supervision and diagnostic module for detecting and rectifying faults in a plurality of components comprised in the intelligent electronic device, the supervision and diagnostic module comprising a fault tree model and a Bayesian network, each component from the plurality of components comprises an interface wherein the interface provides information associated with working of at least one element of the component and enables and disables operation of the at least one element of the component, the intelligent electronic device is configured to:

detect a failure event in the plurality of components of the intelligent electronic device;

obtain a first list of cause of failures in at least one component from the plurality of components of the intelligent electronic device using the fault tree model;

compute probabilities of the causes of the failures to obtain a second list of probable causes of failure by monitoring of information associated with working of elements comprised in the at least one component identified in the first list;

identify at least one root cause of failure associated with the at least one element comprised in the at least one component using the Bayesian network based on the second list wherein the second list is obtained before identifying the root cause of failure using the Bayesian network; and initiate at least one of the functions of:

restarting at least one element comprised in the at least one component associated with the root cause of failure based on enabling and disabling operation through the interface of the at least one component;

enabling a filtering operation for input data provided to the at least one element comprised in the at least one component associated with the root cause of failure; and providing an alert in the human machine interface associated with the intelligent electronic device.

8. The intelligent electronic device as claimed in claim 7, further comprising a hardware, an operating system and a framework.

9. The intelligent electronic device as claimed in claim 8, wherein the framework comprises a configuration manager that comprises:

configuration information for the elements of the plurality of components;

information in relation to connections of the various elements of the components; and contextual information of the configurations and connections of the components.

10. The intelligent electronic device as claimed in claim 7, wherein the intelligent electronic device is enabled with Internet of Things connectivity.

11. The intelligent electronic device as claimed in claim 7, wherein the human machine interface can be a remote human machine interface connected through a cloud-based system.

\* \* \* \* \*